A. VON SCHRENK.
NAIL, SPIKE, AND THE LIKE.
APPLICATION FILED FEB. 1, 1917.
1,273,427.
Patented July 23, 1918.
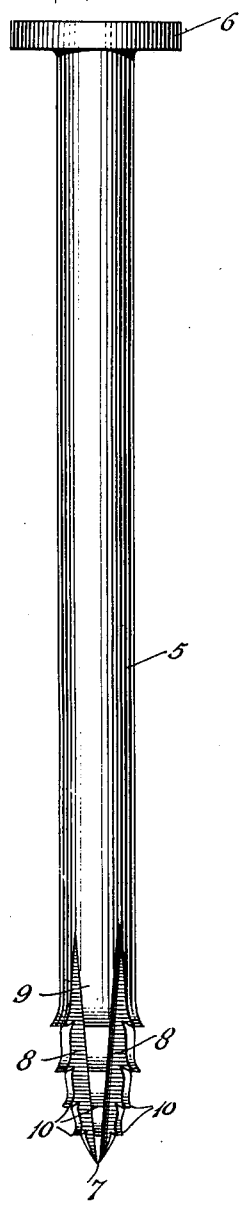
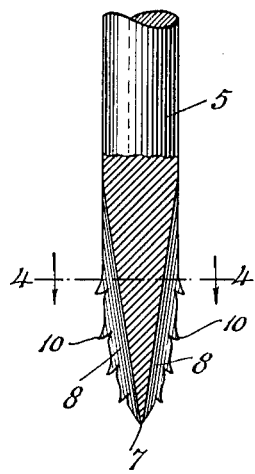
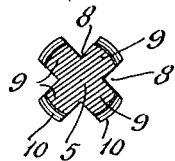

UNITED STATES PATENT OFFICE.

ARNOLD von SCHRENK, OF NEW YORK, N. Y.

NAIL, SPIKE, AND THE LIKE.

1,273,427.    Specification of Letters Patent.    Patented July 23, 1918.

Application filed February 1, 1917.  Serial No. 145,891.

*To all whom it may concern:*

Be it known that I, ARNOLD VON SCHRENK, a citizen of the United States, and resident of the borough of Manhattan, city, county, and State of New York, have invented a certain new and useful Improvement in Nails, Spikes, and the like, of which the following is a specification.

My invention relates to nails, spikes and other driven hold-fast devices. In many cases, in using devices of this character it becomes necessary to drive the nail or the like close to the edge of the material through which the nail is to be driven, or through a material which, owing to its physical characteristics, is readily split. In such cases the nail as ordinarily constructed enters the material wedge fashion and forces apart or opens up the grain or fibers of the wood or other material with the result that unintentional splitting of the material is a constant occurrence. The particular purpose of my invention is to construct a nail in such a manner that on being driven into a material it will act in the nature of a saw whereby the grain or fibers of said material will be cut progressively as the nail is driven home, thus reducing to a minimum or eliminating any transverse forces tending to split the material. My invention will be fully described hereinafter and the features of novelty will be pointed out in the appended claims.

An example of my invention is shown in the accompanying drawings in which Figures 1 and 2 are elevations of a nail provided with my improvement and drawn on an enlarged scale; Fig. 3 is a detail view partly in section and Fig. 4 is a horizontal section on the line 4—4 of Fig. 3.

As shown in the drawings the nail, spike or the like comprises the customary shank 5 which may be of any desired length and diameter and of any suitable cross-sectional form. The said shank 5 as usual, is generally provided at one end with a head 6 and has its other end gradualy tapered to a point as indicated at 7. In the illustrated example the nail or the like is further formed at its lower end with a plurality of grooves or recesses 8 which extend upwardly from the point 7 to a point preferably beyond the beginning of the taper of said lower end as shown in Figs. 1 and 2. The said grooves or recesses 8 are preferably V-shaped in cross-section with the apices thereof pointing inwardly toward the center of said shank 5, said grooves preferably tapering toward their opposite ends as shown in Fig. 2 and further preferably diverging from the point 7 upward as indicated in Fig. 3. With this arrangement ribs 9 are formed between the grooves 8 as illustrated in Fig. 4 and extend lengthwise of said nail, said ribs 9 each becoming gradually wider or having side edges which diverge from the point 7 upwardly as shown in Fig. 1. The ribs 9 are provided on their outer faces or in other words on those faces which form a continuation of the surface of the shank 5 with a plurality of teeth or projections 10 which are preferably in the nature of saw teeth and in any case comprise cutting members having an effective cutting action in the direction in which the nail or the like is driven when operatively used. These teeth or projections which are located in series upon the ribs 9 preferably become progressively larger from the point 7 upward although this arrangement is not arbitrary and may be changed.

With my improved construction as the nail or spike is driven into a material, for instance such as wood, the initial indentation will be made by the point 7 after which the fibers of the wood will be progressively sawed through or cut or crushed as the nail or the like is driven home. As the fibers are thus sawed, cut or crushed the action of the nail or the like as it is being driven into the material will carry some of the cut fibers through the hole made by the nail while other fibers will be forced into the grooves or recesses 8 which accordingly accommodate same, said fibers being finally caused to firmly and securely grip the shank 5 to efficiently hold the nail or the like in place against unintentional withdrawal. The arrangement of teeth or projections 10 and grooves 8 is such that the sawing, cutting or crushing of the fibers and their displacement into the grooves 8 is such as to eliminate the wedging action of the nail or the like or at least reduce it to a minimum. That is to say, such forces as tend to merely separate or open up the fibers from each other in a direction transverse to the axis of the nail or the like are practically eliminated whereby the danger of splitting the material as the nail or the like is driven into the same is substantially avoided.

My improvement thus provides a nail or similar device which may be efficiently driven into a material close to an edge thereof or at other points where the same would normally tend to split easily or into a material which has a natural tendency to split readily. At the same time by forcing the cut or crushed fibers into the grooves of my improvement and owing to the form and location of said grooves, the said fibers are caused to exert a holding force of maximum degree upon the shank of the nail or the like in the final position of the latter. My improved nail or the like in consequence comprises a holdfast of maximum efficiency which may be effectively used in many arts where nails or the like as ordinarily constructed are objectionable. My improved nail or the like is simple and cheap to manufacture and may be driven into even the most easily split material without the necessity for exercising particular care in the operation.

Various changes in the specific form shown and described may be made within the scope of the claims without departing from the spirit of my invention.

I claim:—

1. A nail, spike or the like comprising a shank having a tapering end and a series of cutting means located in a row substantially within the confines of said tapering end and each having a cutting action effective in the direction in which the nail, spike or the like is driven.

2. A nail, spike or the like comprising a shank, and a plurality of cutting devices located in series both transversely and lengthwise of said shank and forming a plurality of successive cutting edges whereby the fibers of the material into which said nail, spike or the like is driven are cut or crushed.

3. A nail, spike or the like comprising a shank having a plurality of lengthwise extending grooves at one end thereof and a plurality of teeth located in series between said grooves and each having a cutting action effective in the direction in which the nail, spike or the like is driven.

4. A nail, spike or the like comprising a shank having a plurality of grooves extending lengthwise thereof at one end, said grooves tapering toward their opposite ends, ribs located between said grooves and tapering toward the point of said shank and a series of cutting teeth on each rib and each having a cutting action effective in the direction in which said nail, spike or the like is driven.

5. A nail, spike or the like comprising a shank, and toothed projections thereon located entirely within an area closely adjacent to the entering end of said nail, spike or the like, said projections extending in the direction in which said nail, spike or the like is driven and adapted to cut or crush the fibers of the material into which said nail, spike or the like is driven.

6. A nail, spike or the like comprising a shank, and toothed projections thereon extending in the direction in which said nail, spike or the like is driven and adapted to cut or crush the fibers of the material into which said nail, spike or the like is driven, said shank being provided with grooves adjacent to said toothed projections accommodating the cut fibers.

In testimony whereof I have hereunto set my hand.

ARNOLD von SCHRENK.